(12) United States Patent
Nobuta et al.

(10) Patent No.: US 6,530,239 B2
(45) Date of Patent: Mar. 11, 2003

(54) REFRIGERATION SYSTEM

(75) Inventors: Tetsuji Nobuta, Kariya; Keiichi Kitamura, Handa, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/010,493

(22) Filed: Nov. 13, 2001

(65) Prior Publication Data

US 2002/0056284 A1 May 16, 2002

(30) Foreign Application Priority Data

Nov. 13, 2000 (JP) .......................... 2000-345712
Sep. 18, 2001 (JP) .......................... 2001-283613

(51) Int. Cl.$^7$ .......................... F25D 19/00; F25D 1/00
(52) U.S. Cl. .......................... 62/296; 181/403; 417/312
(58) Field of Search .......................... 62/296; 181/403; 417/312

(56) References Cited

U.S. PATENT DOCUMENTS

| | | | |
|---|---|---|---|
| 3,134,611 A | * 5/1964 | Iversen | 138/110 |
| 5,238,370 A | * 8/1993 | DiFlora | 181/269 |
| 5,367,883 A | 11/1994 | Sakakibara et al. | 62/85 |
| 5,507,151 A | * 4/1996 | Ring et al. | 181/206 |
| 5,705,777 A | * 1/1998 | Flanigan et al. | 181/252 |
| 5,988,990 A | * 11/1999 | Lee | 181/403 |
| 6,253,564 B1 | * 7/2001 | Yarbrough et al. | 62/238.6 |

FOREIGN PATENT DOCUMENTS

| | | |
|---|---|---|
| JP | 5-306843 | 11/1993 |
| JP | 11-264488 | 9/1999 |

* cited by examiner

*Primary Examiner*—William E. Tapolcai
(74) *Attorney, Agent, or Firm*—Harness, Dickey & Pierce, PLC (57) ABSTRACT

A refrigeration system which can reduce the amount of moisture permeating into the system, inexpensively and by a simple structure, is disclosed. Rubber hoses (7, 8) capable of absorbing vibrations are arranged on the discharge and the intake sides of a compressor (1). It was found that the amount of moisture in the system can be effectively reduced by reducing the amount of moisture permeating the rubber hose on the discharge side. A freezing limit line is set for defining to a predetermined level the amount of moisture in the system determined by the amount of the refrigerant sealed in the system, the amount of the lubricating oil sealed in the system, the amount of moisture permeation of the hoses (7, 8) and the number of the years elapsed after operation start. The hose (7) on the discharge side of the compressor has a smaller amount of moisture permeation than the hose (8) on the intake side. A hose having a moisture permeation not more than the freezing limit line during a predetermined service life is used as the hose (7) on the discharge side.

11 Claims, 4 Drawing Sheets

Fig.1

REFRIGERATION SYSTEM

BACKGROUND OF THE INVENTION

1. Field of the Invention

The present invention relates to an improvement for reducing the moisture permeation into a refrigeration system, which is suitably used for a refrigeration system of an automotive air-conditioning system.

2. Description of the Related Art

In a conventional refrigeration system for an automotive air-conditioning system, a compressor is driven by the automobile engine and therefore is arranged in the same vibrating system as the engine. The other devices of the refrigeration system such as the condenser and the evaporator are fixedly mounted on the automotive body in a vibration system different from the compressor.

The vibrations between the two different vibration systems are absorbed by elastic rubber hoses used as a discharge pipe and an intake pipe of the compressor.

Rubber hose, however, has a much higher moisture permeation than metal pipe, and therefore moisture in the air unavoidably permeates into the system through the rubber hoses. During the operation of the refrigeration system, the refrigerant temperature sharply drops when the refrigerant on high-pressure side is reduced in pressure and expands in a reduction portion, of the decompression units, such as an expansion valve, and moisture in the system is frozen into ice. With the increase in the amount of moisture permeating into the system, the freezing thereof is liable to block the reduction portion of the decompression unit.

In order to prevent this inconvenience, the conventional system comprises a drier with a drying agent such as silica gel used in the system, whereby the moisture permeating into the system is absorbed. The problem, however, is that the dryer increases both the cost and the mounting space.

Japanese Unexamined Patent Publication No. 5-306843 describes a configuration in which the moisture permeation of the rubber hose on the discharge side of the compressor is increased beyond the moisture permeation of the rubber hose on the intake side of the compressor to release the moisture in the system outside from the rubber hose on the discharge side of the compressor. According to this prior art, the moisture permeation of the rubber hose on the discharge side of the compressor is so large that moisture permeating into the system through the rubber hose on discharge side during the service life (10 to 15 years, for example) cannot be suppressed.

SUMMARY OF THE INVENTION

In view of the aforementioned facts, the object of the present invention is to provide a refrigeration system in which the amount of moisture permeating into the system can be reduced at low cost and by using simple means.

Figure 3:
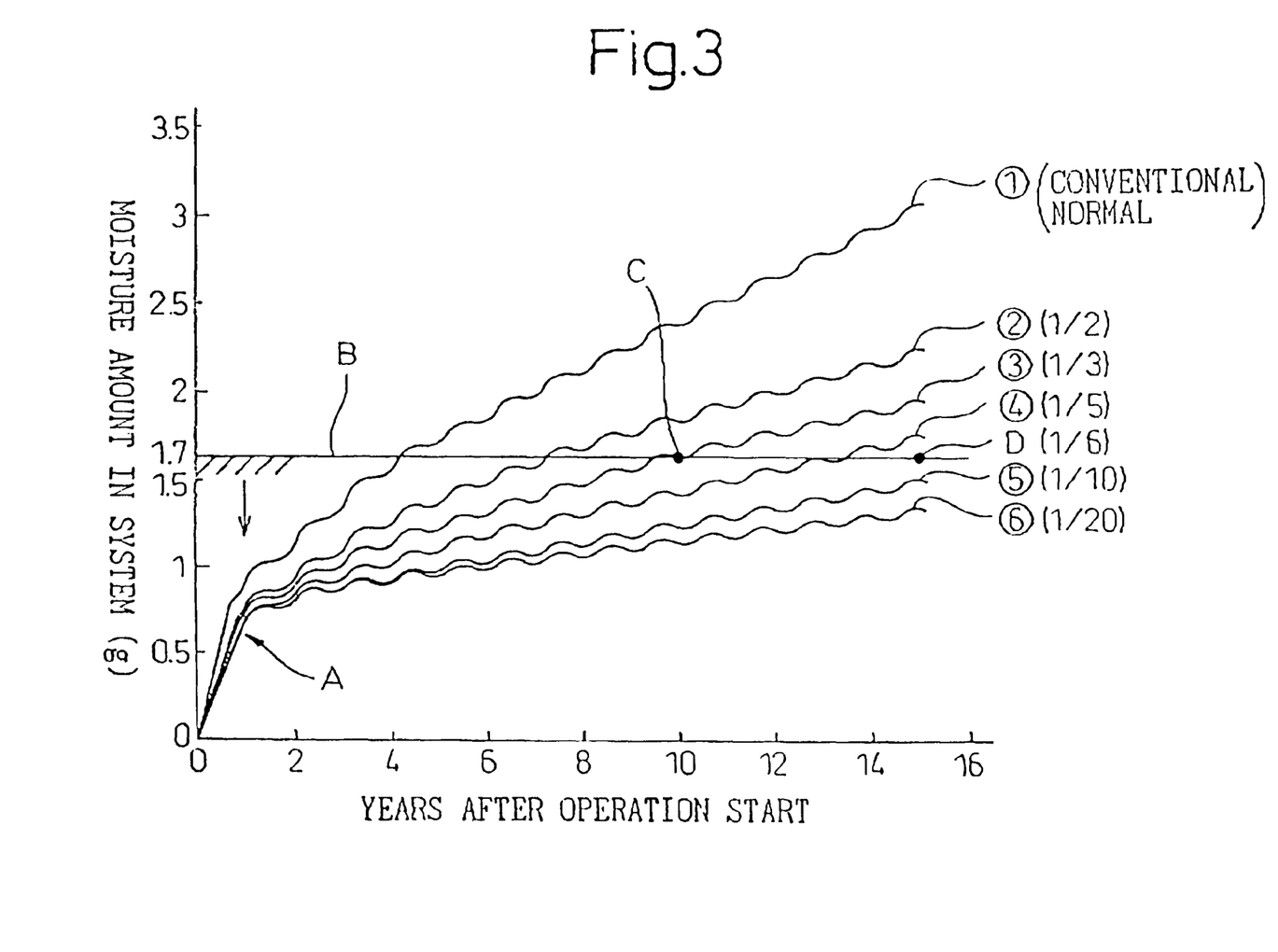
FIG. 3 is a diagram for explaining the relation between the amount of moisture in the system and the number of years elapsed after operation start and showing the effect of the reduced moisture permeability of the rubber hose on the discharge side.
Figure 4:
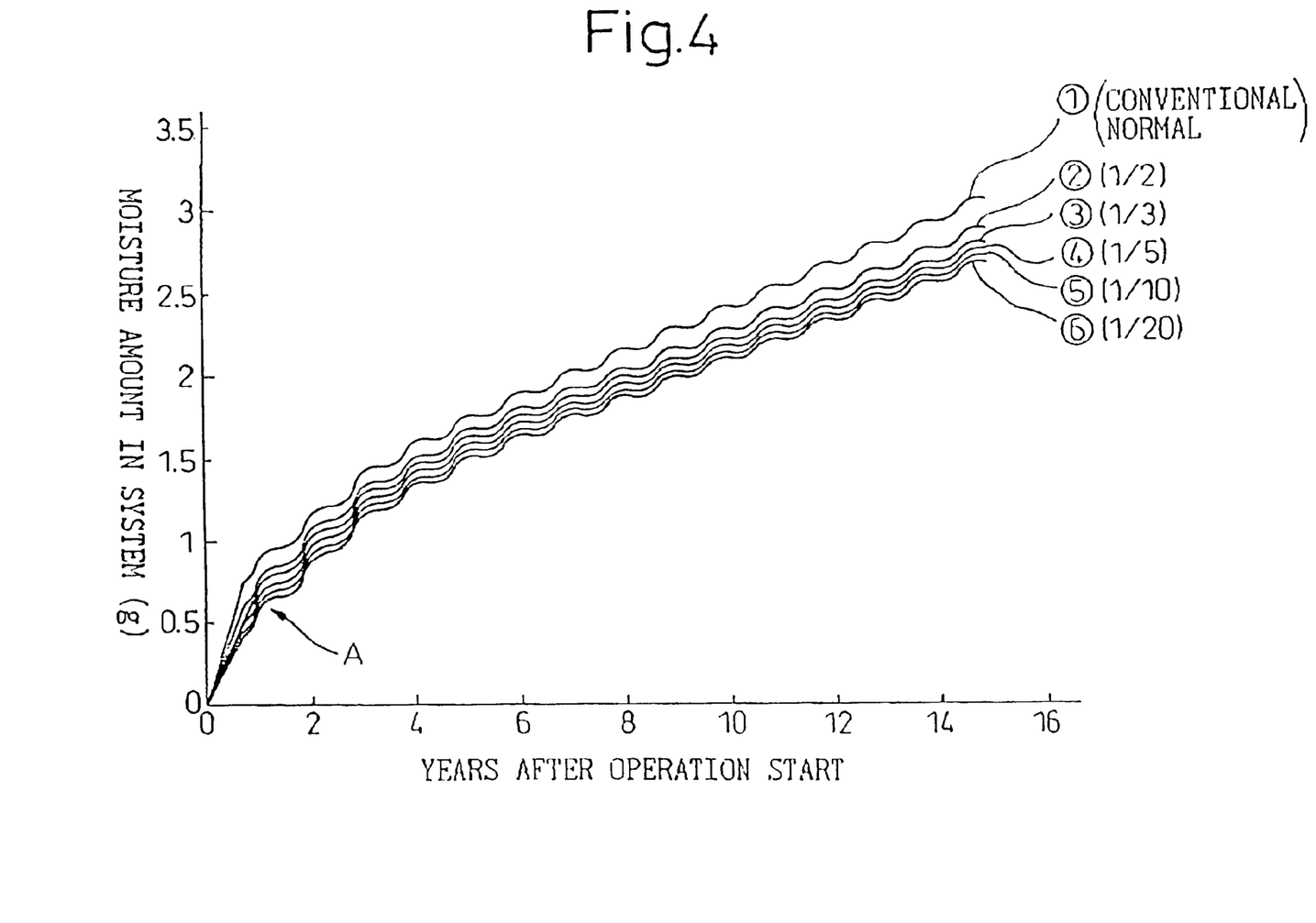
FIG. 4 is a diagram for explaining the relation between the amount of moisture in the system and the number of years elapsed after operation start and showing that the effect of the reduced moisture permeability of the rubber hose on the intake side is small.

According to the invention, means for achieving the above-mentioned object has been devised based on the technical knowledge described below. First, this technical knowledge will be explained. In the graphs of FIGS. 3 and 4, the ordinate represents the moisture content (in g) of the system and the abscissa the period (in years) during which the climate control system has been in operation. FIG. 3 shows the change of moisture content of the system with the change in the moisture permeability (hence the amount of moisture permeation) of the rubber hose on the discharge side of the compressor. On the other hand, FIG. 4 shows the change of the amount of moisture in the system with the change in the water permeability (hence the amount of moisture permeation) of the rubber hose on the intake side of the compressor. The amount of moisture in the system is the sum of the moisture dissolved in the refrigerant and the lubricating oil and the water separated from the refrigerant and the lubricating oil.

FIGS. 3 and 4 show the result of a computer simulation prepared by the inventor. The main numerical conditions include 650 g as the amount of refrigerant sealed in the system, 120 g as the amount of lubricating oil sealed in the system, 380 mm as the length of the rubber hose on the discharge side of the compressor, and 416 mm as the length of the rubber hose on the intake side of the compressor. The refrigerant is specifically HFC 134$a$, and the lubricating oil is specifically a synthetic oil of polyalkylene glycol.

In FIG. 3, the characteristics (1) to (6) are associated with different moisture permeability of the rubber hose on the discharge side, of which the uppermost characteristic (1) is associated with the conventional normal rubber hose.

The moisture permeability of this characteristic (1) is specifically 0.5 g/(m·168 hr). This water permeability is measured in the following way:

1. Drying the hose to be measured
    The hose to be measured is dried for 24 hours at 100° C. in a constant temperature bath.
2. Sealing a drying agent in the hose to be measured
    A predetermined amount of a drying agent corresponding to the inner diameter of the hose to be measured is inserted into the particular hose and the hose ends are hermetically sealed.
3. Measuring the moisture permeability of the hose to be measured
    The hose to be measured is left to stand for a specified time (168 hrs) in a thermo-hygrostat regulated at 60° C. and the relative humidity of 95%.

Upon the lapse of the specified time (168 hrs), the hose to be measured is recovered, the drying agent is retrieved from within the hose, and the weight (in g) of the drying agent is measured.

The moisture permeation amount of the hose to be measured can be determined from the difference (W2−W1) between the weight W2 (g) of the drying agent after the hose to be measured is left to stand for a specified time in the thermo-hygrostat and the weight W1 (g) of the drying agent before insertion into the thermo-hygrostat.

Thus, the moisture permeability can be determined as (W2−W1)/L, i.e. the ratio between (W2−W1) and the hose length L.

On the other hand, the characteristics (2) to (6) have a progressively smaller moisture permeability of the rubber hose downward, i.e. 1/2, 1/3, 1/5, 1/10 and 1/20, of the conventional normal rubber hose corresponding to the characteristic (1).

The lowest characteristic (6), therefore, is the one for the rubber hose on the discharge side having a moisture permeability of 0.025 g/m·168 hrs. In FIG. 4, as in FIG. 3, the characteristics (1) to (6) are the ones associated with different moisture permeabilities of the rubber hose on the intake side, respectively, and specific moisture permeabilities thereof are identical to the corresponding ones shown in FIG. 3.

For the rubber hose on the intake side, as shown in FIG. 4, the difference of moisture amount in the system with the change of elapsed years is small with the change of moisture permeability. The change in the moisture permeability of the rubber hose on the discharge side, on the other hand, is seen to increase the difference of the moisture amount in the system with the change of the elapsed years. Specifically, the moisture amount in the system is reduced only slightly with the reduction of moisture permeability of the hose on the intake side, while the moisture amount in the system is reduced much more with the reduction of the moisture permeability of the rubber hose on the discharge side.

Now, an explanation will be given of the reason why the effect of reducing the moisture amount in the system are greatly different between the intake side and the discharge side of the compressor.

The moisture permeation of the rubber hose is caused by the difference of the partial pressure of water vapor between outside and inside of the hose.

With the refrigeration system for the automotive climate control system, normally after being mounted on the vehicle in the vehicle assembly line of the automobile manufacturer, the flow path in the system is evacuated to discharge the moisture, air etc. out of the system. After that, a predetermined amount of each of the refrigerant and the lubricating oil are sealed in the system. Thus, immediately after the refrigeration system is mounted on the automobile, the system is free of moisture and air.

Immediately after the refrigeration system is mounted on the vehicle, therefore, the partial pressure of water vapor in the hose is substantially zero and considerably different between inside and outside the hose, thereby increasing the moisture permeation w of the rubber hose.

The moisture permeation W (g) of the rubber hose can be determined from equation 1 below.

$$W = k \cdot L (Cb - C)/Cs$$

where k: moisture permeability of hose (g/m·hr)
L: hose length (m)
Cb: future balanced moisture concentration of refrigerant in hose (ppm)
C: present moisture concentration of refrigerant in hose (ppm)
Cs: saturated moisture concentration of refrigerant in hose (ppm)

The moisture concentration of the refrigerant will be explained. The moisture concentration of the refrigerant is defined as the ratio of moisture amount to the sum of the refrigerant and the moisture dissolved in the refrigerant. The moisture concentration of the lubricating oil described later is similarly defined. The balanced moisture concentration Cb is defined as the moisture concentration of the refrigerant in the hose converged to a constant value, in the future, as the water vapor component pressure is balanced (into equal pressure) between inside and outside the hose.

The saturated moisture concentration Cs, on the other hand, is defined as the concentration at which the moisture in the refrigerant is saturated. The moisture exceeding the saturated moisture concentration is released from the refrigerant. The saturated moisture concentration Cs increases in proportion to the temperature of the refrigerant. The moisture permeability k of the hose also increases in proportion to the rise of the hose temperature.

In equation (1), (Cb–C)/Cs is the difference between the ratio (Cb/Cs) of the balanced moisture concentration Cb to the saturated moisture concentration Cs as of the time point when the partial pressure of water vapor is balanced inside and outside the hose on the one hand and the ratio (C/Cs) of the present moisture concentration to the saturated moisture concentration Cs on the other. The larger the difference, the larger the moisture permeation W.

The behavior of moisture permeation of the rubber hose of the refrigeration system will be described in detail for each of various situations including the refrigeration system (compressor) in and out of operation, the system discharge side (high pressure side) and the system intake side (low pressure side).

(1) Refrigeration system (compressor) in operation (ON)

(1-1) Period before the lapse of about one year after start of refrigeration system As to the operating condition of the refrigeration system (compressor), the refrigerant temperature on the intake side of the compressor is as low as about 0° C., and therefore the temperature of the outer surface of the rubber hose on the intake side is also reduced. The moisture in the air is dewed on this outer surface. As a result, the outer surface of the rubber hose on the intake side is wetted with dew, so that a high partial pressure of water vapor is maintained outside the intake hose.

The moisture concentration of the refrigerant inside the hose on the intake side, on the other hand, is greatly reduced by the evacuation process when mounted on the vehicle as described above. Thus, (Cb–C)/Cs in equation (1) assumes a large value. As a result, a large amount of moisture intrudes into the system through the rubber hose on intake side having the outer surface wetted with the dew water.

In the process, the rubber hose on the discharge side of the compressor is heated to a high temperature by the high-temperature (about 70° C.) refrigerant discharged from the compressor, and therefore the moisture permeability k(d) of the rubber hose on the discharge side is larger than the moisture permeability k(s) of the rubber hose on the intake side. Since no dew is generated on the outer surface of the rubber hose on the discharge side, however, the partial pressure of water vapor outside the rubber hose on the discharge side remains low. As a result, the amount of moisture permeated from the rubber hose on the discharge side is very small as compared with the amount of moisture permeated from the rubber hose on the intake side.

(1-2) Period after about one year of operation of refrigeration system

The moisture concentration of the refrigerant in the system progressively increases in proportion to the amount of moisture permeation W. On the outer surface of the rubber hose on the intake side, however, the partial pressure of the outside water vapor is always high due to the dewing of the outer surface of the rubber hose on the intake side. Also, since the refrigerant temperature in the hose (on intake side) is low, the partial pressure of the inner water vapor remains lower than the partial pressure of outer water vapor even though the moisture concentration of the refrigerant in the hose is almost saturated. As a result, the moisture continues to permeate (intrude) into the system through the rubber hose on the intake side.

With the rubber hose on the discharge side, on the other hand, the moisture may be released depending on the atmospheric conditions due to the increased moisture concentration of the refrigerant in the system. Specifically, since the partial pressure of water vapor in the hose is proportional to the moisture concentration of the refrigerant in the system, the moisture in the system may be released into the atmosphere through the rubber hose on the discharge side due to the increased moisture concentration of the refrigerant in an area having an extremely low atmospheric humidity or in a season when the atmospheric humidity is extremely low. Over the whole operation period, however, the moisture is permeated (intrudes) into the system from the rubber hose on the discharge side in an overwhelmingly greater amount than it is released into the atmosphere.

During the operation of the refrigeration system, a large amount of moisture permeates into the system through the rubber hose on the intake side. The operation time of the refrigeration system (the operation time of the automotive air-conditioning system), however, represents a very small ratio of the years passed from the operation start of the system. The amount of moisture permeated into the system during the operation of the refrigeration system, therefore, is negligibly small as compared with the amount of moisture permeated into the system over the years of operation after the start of the system operation.

(2) Refrigeration system (compressor) out of operation (off)

Experiments and study by the present inventor show that immediately after stopping the operation of the refrigeration system, the moisture in the system is distributed substantially equally on high and low pressure sides. Specifically, in the case where the total amount of moisture in the system is 1.7 g, the moisture amount in the refrigerant path on high pressure side (from the discharge side of the compressor to the inlet side of the decompression unit) is 0.83 g, and the moisture amount in the refrigerant path on low pressure side (from the outlet side of the decompression unit to the intake side of the compressor) is 0.87 g.

Under this condition, the amount of refrigerant in the system is 650 g and the amount of lubricating oil in the system is 120 g. Immediately after stopping the operation of the refrigeration system, therefore, the refrigerant and the lubricating oil are distributed in the amount of 612 g on high pressure side and 158 g on low pressure side. The refrigerant and the lubricating oil are distributed in a greater amount on high pressure side immediately after stopping of the system operation as described above by reason of the fact that the liquid refrigerant stays in the portion from the outlet side of the condenser to the inlet side of the decompression unit through the liquid receiver.

On the other hand, immediately after stopping the system operation, the refrigerant and the lubricating oil exist in a great amount on high pressure side but the amount of moisture in the system is distributed substantially equally on high and low pressure sides due to the fact that the lubricating oil exists independently as it is separated from the gas refrigerant on the low pressure side during the system operation. Specifically, the lubricating oil is dissolved in the liquid refrigerant on the outlet side of the condenser on the high pressure side of the system, while the gas-liquid two-phase refrigerant is evaporated into the gaseous refrigerant in the evaporator and therefore the lubricating oil exists independently as it is separated from the gaseous refrigerant on the low pressure side of the system. Further, a large amount of the lubricating oil stays because of the density difference between the gas refrigerant and the lubricating oil on the low pressure side of the system.

In addition, in the case where the temperature is low on the low pressure side of the system, the saturated moisture concentration of the gas refrigerant is about 350 ppm which compares with a much higher figure of about 10000 ppm for the saturated moisture concentration of the lubricating oil. As a result, much moisture is dissolved in the lubricating oil staying on the low pressure side of the system. Thus, even on the low pressure side with a smaller amount of refrigerant distributed than on the high pressure side, the moisture of substantially the same amount as on the high pressure side is distributed as the lubricating oil retrieves moisture.

For some time after the refrigeration system (compressor) stops, the low temperature is maintained by the thermal capacity of the rubber hose on the intake side, and the outer surface of the hose is kept wet by the dew water. For some length of time after the system stops, therefore, moisture continues to intrude from the rubber hose on the intake side.

The protracted suspension of operation of the refrigeration system (compressor) causes the pressure on high pressure side of the system and the pressure on low pressure side of the system to approach each other gradually until they are equalized at the saturated pressure determined by the ambient temperature around the system. Almost all the refrigerant in the system becomes a saturated liquid under the saturation pressure, and therefore the lubricating oil that has thus far existed as an independent entity is dissolved in the saturated liquid refrigerant on low pressure side of the system.

Then, the moisture that has thus far been dissolved in the lubricating oil leaves the lubricating oil and is dissolved in the refrigerant. In the process, as the amount of the refrigerant distributed on low pressure side of the system is sufficiently small as compared with the amount of the refrigerant distributed on high pressure side, the moisture concentration of the refrigerant on low pressure side sharply increases when the system stops, so that the saturated moisture concentration is reached at an early time.

Experiments and a study conducted by the inventor revealed that in about one year after starting the operation of the system, the moisture concentration of the refrigerant on low pressure side while the system stops reaches the saturated moisture concentration, after which substantially no moisture intrudes into the refrigerant on low pressure side during the system stop. FIGS. 3A and 4A show the portion of the period of about one year after starting the operation of the system when the moisture amount in the system sharply rises by the moisture permeated from both the high and low pressure sides of the system.

While the system stops, on the other hand, the refrigerant is distributed in a sufficiently greater amount on high pressure side than on low pressure side. Thus, the refrigerant comes to assume equal pressure on high and low pressure sides. Even when the moisture in the lubricating oil is dissolved in the refrigerant, therefore, the moisture concentration of the refrigerant on high pressure side increases only at a small rate. As a result, while the system is stopped, the moisture intrusion is continued over a long period on the high pressure side even after the lapse of about one year following the start of operation of the system.

Specifically, upon the lapse of about one year or longer after the operation start of the system, the moisture intrudes into the system for the most part due to the permeation from the rubber hose on the discharge side during the system stop. The amount of moisture intruding into the system during the system operation is very small as compared with the amount of moisture intrusion into the system while the system is stopped. Consequently, the amount of moisture in the system can be effectively reduced by reducing the amount of moisture permeated from the rubber hose on the discharge side.

This is obvious from the comparison between FIGS. 3 and 4. As shown in FIG. 4, even in the case where the moisture permeability of the rubber hose on the intake side is reduced to one twentieth (characteristic (6)) of the figure for the conventional product, the moisture intruding into the system is reduced only by a very small amount. As for the rubber hose on the discharge side, on the other hand, as shown in FIG. 3, the amount of moisture intruding into the system can be effectively reduced by reducing the moisture permeability.

Based on the technical knowledge described above, according to a first aspect of the invention, there is provided a refrigeration system comprising hoses (7, 8) arranged on the discharge side and the intake side of a compressor (1) and capable of absorbing vibrations, wherein a freezing limit line (B) is set for specifying to a predetermined level the moisture amount in the system by the amount of the refrigerant sealed in the system, the amount of the lubricating oil sealed in the system, the amount of moisture permeating the hoses (7, 8) and the number of years passed after operation start, and wherein a hose having an amount of moisture not more than the freezing limit line (B) during a predetermined service life is used as a hose (7) on discharge side.

The freezing limit line (B) is a moisture amount in the system of a level where the moisture is released from the low-pressure refrigerant after passing through the decompression unit (4) during the system operation and freezes in the reduction portion of the decompression unit (4). In other words, it is a moisture amount in the system at which the moisture concentration of the low-pressure refrigerant reaches the saturated moisture concentration and the amount of the released moisture causes the freezing of the reduction portion during the system operation. In the example of FIG. 3, the moisture amount in the system at the freezing limit line (B) is set to 1.7 g.

During the service life of the refrigeration system of about 10 to 15 years, the amount of moisture intrusion from the hose on the discharge side (7) can be suppressed and the increase in the moisture amount in the system can be effectively suppressed by using a hose (7) having such a moisture permeation amount that the amount of moisture in the system is not more than the freezing limit line (B). Thus, the reduction portion can be prevented from being closed by the freezing of the decompression unit (4) by simple means of changing the configuration of the hose (7) on discharge side.

According to a second aspect of the invention, there is provided a refrigeration system wherein the hose (7) on the discharge side of the compressor (1) has a moisture permeation amount smaller than the hose (8) on intake side.

As a result, the increase of the moisture amount in the system can be effectively suppressed and the freezing of the decompression unit (4) can be prevented by the hose (7) on the discharge side without resorting to the hose (8) on the intake side.

According to a third aspect of the invention, there is provided a refrigeration system, wherein the moisture permeation for the refrigerant amount of 650 g, the lubricating oil amount of 120 g, the discharge-side hose (7) length of 380 mm and the discharge-side hose (7) moisture permeability of 0.5 g/(m·168 hrs) is used as a reference value, and the amount of moisture permeation of the hose (7) on the discharge side is set to not more than one third of the reference value.

The moisture permeability is measured by the method described above. According to the third aspect of the invention, as illustrated at point C in FIG. 3, before the lapse of a predetermined service life (say, ten years), the amount of moisture in the system is suppressed to not more than the freezing limit line (B) thereby to prevent the freezing of the decompression unit (4).

According to a fourth aspect of the invention, there is provided a refrigeration system, wherein the amount of moisture permeated through the hose (7) on the discharge side is not more than one sixth of the reference value.

As a result, as illustrated at point D in FIG. 3, before the lapse of a service life (say, 15 years) longer than that of the second aspect, the amount of moisture in the system is suppressed to not more than the freezing limit line (B) thereby to prevent the freezing of the decompression unit (4).

According to a fifth aspect of the invention, there is provided a refrigeration system, wherein the hose (7) on the discharge side and the hose (8) on the intake side are specifically a rubber hose having at least a rubber layer (11, 14). This rubber hose is elastic and has a superior function of absorbing vibrations, although it is easily permeated by moisture. According to this aspect of the invention, however, the increase in the amount of moisture in the system can be effectively suppressed even by the use of the rubber hose.

According to a sixth aspect of the invention, there is provided a refrigeration system comprising rubber hoses (7, 8) capable of absorbing vibrations on the discharge and intake sides of the compressor (1), wherein the amount of moisture permeation of the rubber hose (7) on the discharge side is smaller than the amount of moisture permeation of the rubber hose (8) on the intake side.

In view of the fact that the amount of moisture in the system can be effectively reduced by reducing the amount of moisture permeation of the rubber hose on the discharge side as described above, according to the sixth aspect of the invention, the increase of the moisture amount in the system is effectively suppressed by use of a rubber hose (7) on the discharge side having a smaller amount of moisture permeation than the rubber hose (8) on the intake side, thereby contributing to the prevention of freezing of the decompression unit (4).

According to a seventh aspect of the invention, there is provided a refrigeration system, wherein the amount of moisture permeation of the rubber hose (7) on the discharge side in the sixth aspect is not more than one third of the amount of moisture permeation of the rubber hose (7, 8) on the intake side.

As a result, as illustrated at point C in FIG. 3, before the lapse of a predetermined service life (say, ten years), the amount of moisture in the system is suppressed to not more than the freezing limit line (B) thereby to prevent the freezing of the decompression unit (4).

According to an eighth aspect of the invention, there is provided a refrigeration system, wherein the amount of moisture permeation of the rubber hose (7) on the discharge side is preferably pot more than one sixth of the amount of moisture permeation of the rubber hose (7, 8) on the intake side.

As a result, as illustrated at point D in FIG. 3, before the lapse of a predetermined service life (say, 15 years), the amount of moisture in the system is suppressed to not more than the freezing limit line (B) thereby to prevent the freezing of the decompression unit (4).

According to a ninth aspect of the invention, there is provided a refrigeration system, wherein the rubber hose (7) on the discharge side includes a metal film layer (12) for reducing the amount of moisture permeation, thereby making it possible to effectively reduce the amount of moisture permeation of the rubber hose (7) on the discharge side.

According to a tenth aspect of the invention, there is provided a refrigeration system, wherein the rubber hose (7) on the discharge side can be formed of a multilayered structure with the metal film layer (12) interposed in the intermediate portion along the diameter thereof.

According to an 11th aspect of the invention, there is provided a refrigeration system, wherein the refrigerant can be circulated in the absence of a dryer for absorbing moisture. Specifically, the increase in the amount of moisture in the system can be effectively suppressed by reducing the amount of moisture permeation from the hose (7) on the discharge side, and therefore the dryer can be eliminated.

The reference numerals in parentheses designating the means described above correspond to the reference numerals designating the specific means described in the embodiments below.

DESCRIPTION OF THE PREFERRED EMBODIMENTS

First Embodiment

Figure 1:
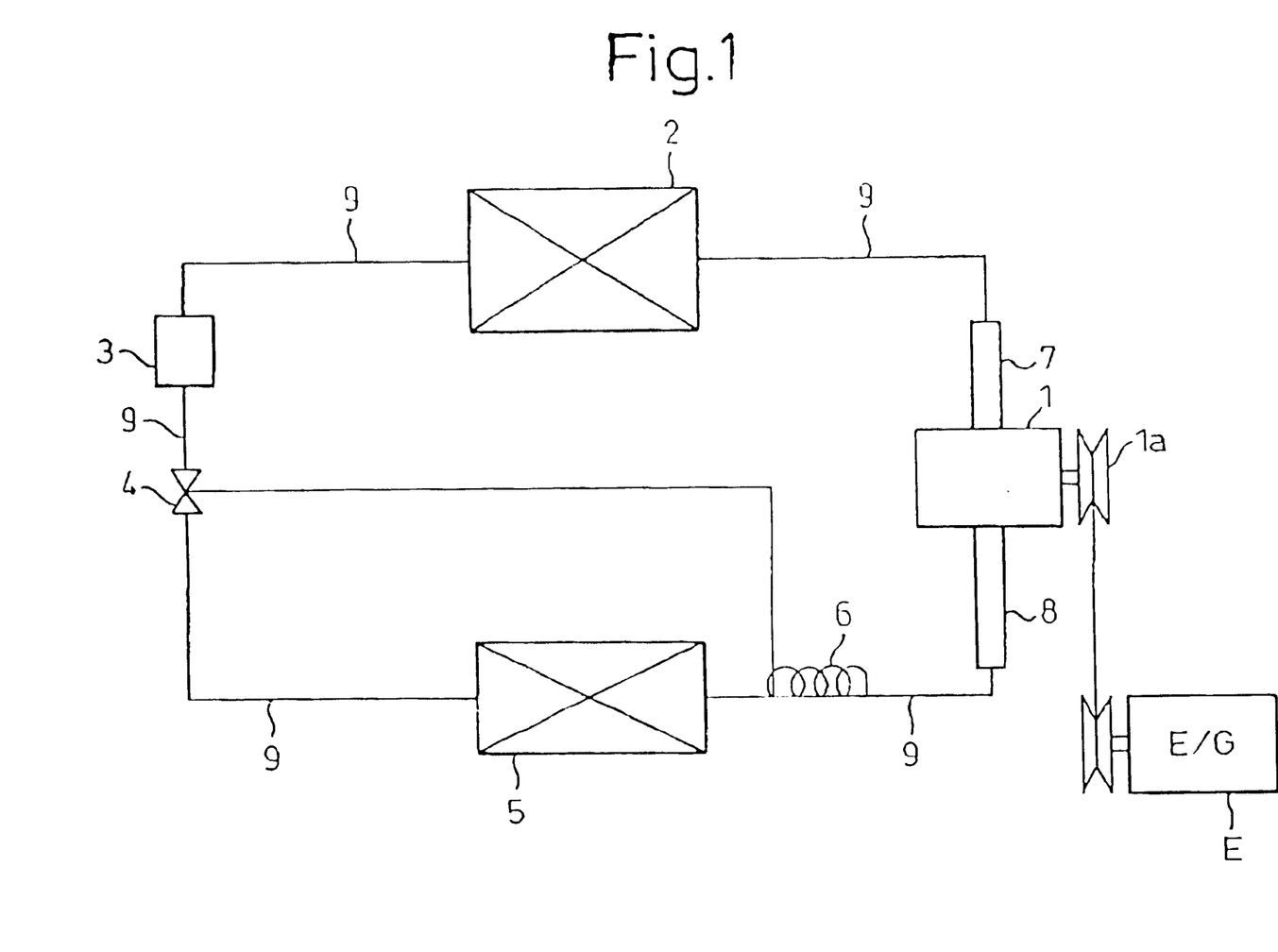
FIG. 1 is a system diagram of a refrigeration system according to a first embodiment of the invention.

FIG. 1 shows a refrigeration system for an automotive climate control system according to the first embodiment of the invention. A compressor 1 is driven by belt from an automobile engine E through an electromagnetic clutch 1a. The high-pressure gaseous refrigerant discharged from the compressor 1 flows into a condenser 2, in which exchanging heat with the atmospheric air, the refrigerant is condensed.

The condenser 2 is arranged at the portion of the automobile where it is cooled by the wind generated as the automobile moves. Specifically, the condenser 2 is arranged at the foremost portion in the engine room of the automobile, and cooled by the air generated by the movement and the air blown by the condenser fan (not shown). A liquid receiver 3 pools the extraneous liquid refrigerant by separating the gaseous and liquid refrigerants passed through the condenser 2 while at the same time leading the liquid refrigerant to a temperature-type expansion valve 4.

The temperature-type expansion valve 4 is a decompression unit for reducing the liquid refrigerant from the liquid receiver 3 into two phases of gas and liquid at low pressure. An evaporator 5 is for evaporating the low-pressure refrigerant that has passed through the temperature-type expansion valve 4, by absorbing heat from the air blown from an air-conditioning blower (not shown). The evaporator 5 is arranged in a case (not shown) of an air-conditioning indoor unit. The air cooled, as is well known, by the evaporator 5 is blown into the cabin after being temperature-regulated in a heater core portion not shown. The gas refrigerant evaporated in the evaporator 5 is absorbed into the compressor 1. The temperature of the refrigerant at the outlet of the evaporator 5 is sensed by a temperature sensing cylinder 6 and fed back to the temperature-type expansion valve 4.

The refrigeration system according to the first embodiment is not equipped with a dryer for absorbing the moisture into the system. The refrigerant and the lubricating oil, therefore, are circulated in the absence of the dryer. specifically, the refrigerant is HFC134a and the lubricating oil a synthetic oil of polyalkylene glycol or a synthetic oil of polyvinyl ether. The saturated moisture concentration of the lubricating oil assumes a much higher value than that of the refrigerant as described above.

In order to prevent the evaporator 5 from being frosted, the temperature of the evaporator 5 is controlled to not lower than a predetermined temperature (say, 3° C. to 4° C.) by on-off operation control of the compressor 1 or by controlling the discharge capacity of the compressor 1.

The compressor 1, which is driven by the automobile engine E, is arranged in the same vibration system as the automobile engine E. The remaining devices such as the condenser 2 and the evaporator 5 of the refrigeration system, on the other hand, are mounted fixedly on the vehicle body and therefore are placed in a vibration system different from the compressor 1. In view of this, elastic rubber hoses 7 and 8 are used for the pipes on the discharge and intake sides, respectively, of the compressor 1 so as to absorb the vibrations between the two different vibration systems.

In the other portions of the refrigeration system, the refrigerant paths between all the devices are connected to each other by a metal pipe 9. The metal pipe 9 is normally formed of aluminum. The rubber hose 7 on the discharge side of the compressor connects the metal pipes of the discharge port of the compressor 1 and the intake side of the condenser 2, while the rubber hose 8 on the intake side of the compressor 1 connects the metal pipes of the intake port of the compressor 1 and the outlet side of the evaporator 5.

According to the first embodiment, only the rubber hose 7 on the discharge side of the compressor 1, but not the rubber hose 8, has a structure smaller in moisture permeation than the normal hose. The rubber hose 8 on the intake side of the compressor 1, on the other hand, is structured to have the same moisture permeation amount as the normal hose.

Figure 2:
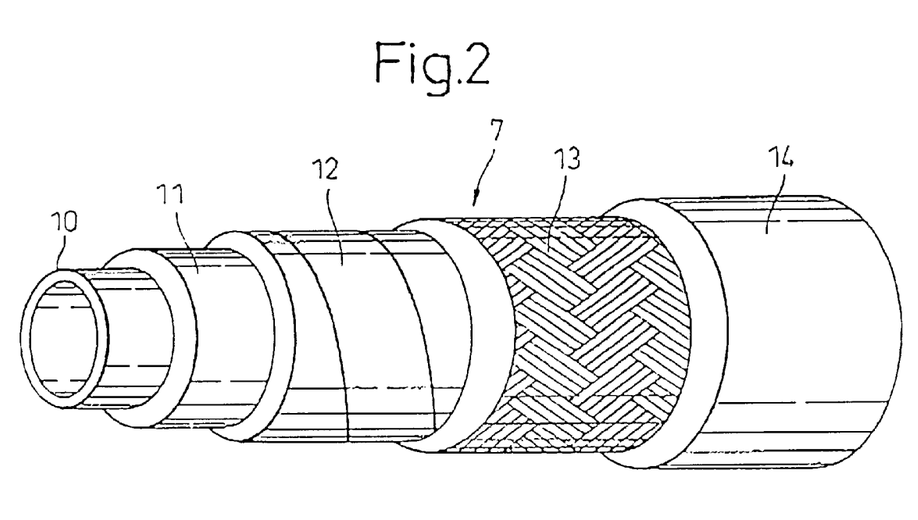
FIG. 2 is a broken-out perspective view illustrating a rubber hose on the discharge side according to the first embodiment.

FIG. 2 shows a specific example of configuration of the rubber hose 7 on the discharge side of the compressor 1. The hose 7 has a multilayered structure with a plurality of layers formed along the diameter thereof. The innermost resin layer 10 is in contact with the refrigerant for preventing the permeation of the gas, and is formed of resin having a low gas permeability such as polyamide resin, polyolefin resin, ethylene vinyl alcohol copolymer (EVOH), poly(vinylidene chloride) (PVDC) or a blended resin thereof.

An intermediate rubber layer 11 is formed on the outer surface of the inner resin layer 10. The intermediate rubber layer 11 covers the outer surface of the inner resin layer 10 and thus contributes to securing the elasticity (flexibility) of the hose. The intermediate rubber layer 11 is preferably formed of a material highly capable of preventing the permeation of moisture from outside. A material highly capable of preventing moisture permeation includes isobutylene rubber such as isobutylene isoprene copolymer rubber (IIR), or butyl halide rubber such as butyl chloride rubber (Cl-IIR), and butyl bromide rubber (Br-IIR).

The outer surface of the intermediate rubber layer 11 is covered with a metal film layer 12 for remarkably reducing the moisture permeation amount. The metal film layer 12 is specifically made of an aluminum foil about 2 $\mu$m thick in the form of a tape having a predetermined width. The aluminum foil in tape form is wound spirally on the outer surface of the intermediate rubber layer 11. Thus, the metal film layer 12 blocks the moisture permeation and reduces the amount of moisture permeated.

A reinforcing fiber layer 13 is covered on the outer surface of the metal film layer 12. The reinforcing fiber layer 13 is for reinforcing the hose proper and is formed by braiding a fiber. The fiber is formed of a synthetic fiber such as polyethylene terephthalate, polyester, polyamide or aramid alone or a mixed fiber thereof.

The outer surface of the reinforcing fiber layer 13 is formed with an outer rubber layer 14 as the outermost layer. The outer rubber layer 14, which also contributes to securing the elasticity (flexibility) of the hose, is formed of a synthetic rubber having a superior ozone resistance such as ethylene propylene diene copolymer rubber (EPDM) to suppress the damage which otherwise might be caused by the ozone from the high tension cord of the automobile engine ignition system.

According to the first embodiment, the metal film layer 12 interposed in the diametrically intermediate portion of the multilayered structure of the rubber hose 7 on the discharge side can block the moisture which otherwise would permeate through the multilayered hose structure in diametrical direction. Thus, the moisture is forced to circumvent the metal film layer 12. As a result, the amount of moisture permeated from the rubber hose 7 on the discharge side can be effectively reduced as compared with the moisture amount permeated through the rubber hose 7 on the intake side, thereby making it possible to suppress the moisture amount in the system to a small value for a long time.

The provision of the metal film layer 12 on the rubber hose 7 on the discharge side reduces the moisture permeability of the rubber hose 7 on the discharge side to the level of one twentieth of the figure for the conventional normal product ((6)) of FIG. 3) and makes it possible to suppress the moisture amount in the system to the level of about 1.3 g which is sufficiently smaller than the freezing limit line B (1.7 g) even upon the lapse of 15 years after operation start.

In the case where the service life of the refrigeration system is ten years, the moisture permeability of the rubber hose 7 on the discharge side is sufficiently at the level one third of the figure for the conventional normal product as indicated by point C in FIG. 3. In the case where the service life of the refrigeration system is 15 years, on the other hand, the moisture permeability of the rubber hose 7 on the discharge side is sufficiently at the level one sixth of the figure for the conventional normal product.

According to the first embodiment, the moisture permeation is reduced by the interposition of the metal film layer 12 only for the rubber hose 7 on the discharge side, while no specific measure is taken to reduce the moisture permeation for the rubber hose 7 on the intake side which has a normal hose structure. The system cost, therefore, is low.

Second Embodiment

Unlike the first embodiment having the metal film layer 12 interposed in the diametrically intermediate portion of the multilayered hose structure to reduce the moisture permeation of the rubber hose 7 on the discharge side, the second embodiment is such that a component capable of blocking the moisture permeation or specifically the clay-organic complex (clay mineral) described in Japanese Unexamined Patent Publication No. 11-159667 is mixed in one or all of the inner resin layer 10 and the rubber layers 11, 14 of the rubber hose 7 on the discharge side. The clay-organic complex (clay mineral) mixed in the rubber layers 11, 14 lengthens the moisture permeation path and reduces the amount of moisture permeated in the rubber hose 7 on the discharge side, thereby eliminating the use of the metal film layer 12.

Third Embodiment

According to the third embodiment, a material having a small moisture permeation such as fluororubber or high-nitryl butadiene copolymer rubber (high NBR) is used as a rubber material of one or both of the intermediate rubber layer 11 and the outer rubber layer 14 of the rubber hose 7 on the discharge side. As a result, the amount of moisture permeation of the rubber hose 7 on the discharge side can be reduced without using the metal film layer Fourth Embodiment According to the fourth embodiment, an accordion metal hose is used as a hose on the discharge side. The accordion structure of the metal hose exhibits the function of absorbing vibrations, and the fact that the material of the hose proper is a metal can reduce the amount of moisture permeation of the hose on the discharge side.

Fifth Embodiment

The fifth embodiment is intended to reduce the moisture permeation of the hose by changing the dimensional specification of the rubber hose 7 on the discharge side. Although the rubber hose 7 on the discharge side is set normally to the length of about 380 mm or more, for example, the hose according to this embodiment is shortened to 80 mm or less. As a result, while the moisture permeability of the hose 7 remains the same, the moisture permeation can be reduced by the length of the hose 7 (the reduced surface area of the hose). As another alternative, by reducing the diameter of the rubber hose on the discharge side, the surface area of the hose can be further reduced for an even smaller amount of moisture permeation.

Other Embodiments

The first embodiment was explained above with reference to the case lacking a dryer for absorbing moisture in the internal flow path of the system. Nevertheless, the dryer may be so arranged with equal effect. In such a case, the amount of moisture in the system can be reduced by reducing the amount of moisture permeated from the rubber hose 7 on the discharge side. Thus, the operation load of the dryer can be reduced.

In addition to the rubber hose 7 on the discharge side, the measure for reducing the moisture permeation can be taken such as by interposing the metal film layer 12 also on the rubber hose 7 on intake side, as required.

What is claimed is:

1. A refrigeration system comprising:
   a compressor (1) for compressing and discharging a refrigerant, a condenser (2) for condensing the refrigerant discharged from said compressor (1), a decompression unit (4) for reducing the pressure of the refrigerant condensed by said condenser (2), and an evaporator (5) for evaporating the low-pressure refrigerant decompressed in said decompression unit (4);
   said system further comprising hoses (7, 8) capable of absorbing the vibrations arranged on the discharge side and the intake side of the compressor (1),
   wherein a freezing limit line (B) is set for defining to a predetermined level the moisture amount in the system determined by the amount of the refrigerant sealed in the system, the amount of the lubricating oil sealed in the system, the amount of moisture permeation of the hoses (7, 8) and the number of years passed after operation start, and
   wherein a hose having an amount of moisture permeation not more than the freezing limit line (B) during the years of a predetermined service life is used as a hose (7) on the discharge side of said compressor (1).

2. A refrigeration system according to claim 1,
wherein the hose (7) on the discharge side of the compressor (1) has a moisture permeation amount smaller than the hose (8) on the intake side.

3. A refrigeration system according to claim 1,
wherein the amount of moisture permeation of the hose (7) on the discharge side is set to not more than one third of a reference value constituting a moisture permeation amount for the refrigerant amount of 650 g, the lubricating oil amount of 120 g, the discharge-side hose (7) length of 380 mm and the moisture permeability of 0.5 g/(m·168 hr) for the hose (7) on the discharge side, and the amount of moisture permeation of the hose (7) on the discharge side is set to not more than one third of said reference value.

4. A refrigeration system according to claim 3,
wherein the amount of moisture permeated through said hose (7) on the discharge side is not more than one sixth of said reference value.

5. A refrigeration system according to claim 1,
wherein the hose (7) on the discharge side and the hose (8) on the intake side are specifically a rubber hose having at least a rubber layer (11, 14).

6. A refrigeration system comprising:
a compressor (1) for compressing and discharging a refrigerant, a condenser (2) for condensing the refrigerant discharged from said compressor (1), a decompression unit (4) for reducing the pressure of the refrigerant condensed by said condenser (2), and an evaporator (5) for evaporating the low-pressure refrigerant decompressed in said decompression unit (4); said system further comprising rubber hoses (7, 8) capable of absorbing vibrations on the discharge and the intake sides of the compressor (1),
wherein the amount of moisture permeation of the rubber hose on the discharge side (7) is smaller than the amount of moisture permeation of the rubber hose (8) on the intake side.

7. A refrigeration system according to claim 6,
wherein the amount of moisture permeation of the rubber hose (7) on the discharge side is not more than one third of the amount of moisture permeation of the rubber hoses (7, 8) on the intake side.

8. A refrigeration system according to claim 7,
wherein the amount of moisture permeation of the rubber hose (7) on the discharge side is not more than one sixth of the amount of moisture permeation of the rubber hoses (7, 8) on the intake side.

9. A refrigeration system according to claim 5,
wherein the rubber hose (7) on the discharge side includes a metal film layer (12) for reducing the amount of moisture permeation.

10. A refrigeration system according to claim 9,
wherein the rubber hose (7) on the discharge side has a multilayered structure with said metal film layer (12) interposed in the intermediate portion along the diameter of said structure.

11. A refrigeration system according to claim 1 or 6,
wherein the refrigerant is circulated in the absence of a dryer for absorbing moisture.

* * * * *